United States Patent [19]

Carrieri

[11] 4,068,520

[45] Jan. 17, 1978

[54] CAM ACTUATED EJECTOR MECHANISMS FOR PRESSES

[75] Inventor: Louis F. Carrieri, LaGrange Park, Ill.

[73] Assignee: Gulf & Western Manufacturing Company, Southfield, Mich.

[21] Appl. No.: 686,448

[22] Filed: May 13, 1976

[51] Int. Cl.² ...................... B21D 45/02; B21D 45/04; F16H 25/18

[52] U.S. Cl. ........................................ 72/427; 72/345; 74/110; 83/125; 83/127; 83/137; 100/218

[58] Field of Search ................. 72/344, 345, 352, 358, 72/361, 426, 427; 425/422, 436, 436 R, 444; 10/11 E; 100/218; 74/110; 113/7 A, 7 R, 1 G; 83/125, 127, 128, 137

[56] References Cited

U.S. PATENT DOCUMENTS

| | | | |
|---|---|---|---|
| 2,159,901 | 5/1939 | LeJeune | 72/358 X |
| 2,278,643 | 4/1942 | Braun | 72/426 X |
| 2,507,748 | 5/1950 | Alspaugh et al. | 72/341 |
| 2,537,426 | 1/1951 | Saalfrank | 425/422 X |
| 2,802,381 | 8/1957 | Leasia | 72/427 |
| 3,287,948 | 11/1966 | Alexander et al. | 72/358 X |
| 3,299,453 | 1/1967 | Van de Meerendonk | 72/427 X |
| 3,951,083 | 4/1976 | Hortig | 113/7 A |

FOREIGN PATENT DOCUMENTS

| | | | |
|---|---|---|---|
| 23,269 | 1972 | Japan | 72/427 |
| 1,371,157 | 10/1974 | United Kingdom | 72/427 |

*Primary Examiner*—C.W. Lanham
*Assistant Examiner*—D. M. Gurley
*Attorney, Agent, or Firm*—Meyer, Tilberry & Body

[57] ABSTRACT

A hydraulically actuated ejector mechanism is mounted on a press bed and includes a pair of opposed cams connected to the press slide for vertical displacement therewith. The cams actuate corresponding followers in the form of hydraulic pistons which operate together to hydraulically displace an ejector member during upward movement of the slide following a metalworking operation. The cam contours enable timing the ejector pin displacement with the press slide stroke so as to achieve optimum acceleration and deceleration of the stroke of the ejector pin.

11 Claims, 4 Drawing Figures

CAM ACTUATED EJECTOR MECHANISMS FOR PRESSES

This invention relates to the art of presses and, more particularly, to ejector mechanisms operable in conjunction with operation of the press to eject a workpiece from a die member.

Mechanically and hydraulically actuated ejector mechanisms have of course been provided heretofore for the purpose of ejecting a formed workpiece from a male or female die member following a die shaping operation. Such an ejector mechanism is mounted either on the press bed or on the press slide and is operable during movement of the slide away from the press bed to achieve the ejection function. Timing of the ejector stroke with respect to movement of the slide is often critical, and ejector mechanisms heretofore devised have not provided for achieving optimum coordination between the ejector and slide motion, especially in high speed press operation wherein desired timing and coordination are more difficult to achieve. Further, mechanically actuated ejector arrangements heretofore provided are often massive and difficult to construct and install. Thus, they are expensive and, because of the size thereof, can reduce the strength of the press bed in those situations where the ejector mechanism is mounted in the bed of the press. Hydraulic ejector mechanisns heretofore provided are disadvantageous from the standpoint that timing of the actuation thereof in coordination with slide movement is poor, especially in high speed press operation. Poor timing results from variations in valve actuation in the hydraulic system, such as variations in the response times of the valves. Moreover, in both the mechanical and hydraulic arrangements heretofore provided, variations in motion characteristics of the press slide during movement thereof through the metal forming portion of the total stroke thereof are not compensated for in the ejector system. This too limits the extent to which optimum timing and coordination between the slide movement and ejector displacement can be achieved.

In accordance with the present invention, a hydraulic ejector mechanism is provided by which the foregoing disadvantages and others of previous mechanical and hydraulic arrangements are minimized or avoided. More particularly, an ejector mechanism in accordance with the present invention is mounted on a press bed and includes an ejector member which is hydraulically actuated by a pair of opposed cams movable with the press slide and operable through corresponding hydraulic piston followers to achieve displacement of the ejector member during movement of the slide away from the press bed. The opposed cam and follower arrangement enables achieving maximum mechanical advantage in connection with displacement of the ejector member and thus enables the ejector assembly to be of compact construction. This in turn enables maximizing the strength of the bed structure in comparison with structurally larger ejector assemblies heretofore provided. Further, the cam contour can be provided in accordace with known motion characteristics of a given press slide during the work stroke thereof, whereby optimum timing and acceleration of the ejector member can be achieved in conjunction with the given press. Still further, the opposed cam and follower structure enables achieving a uniform and balanced force distribution between the component parts of the ejector assembly and between the ejector assembly and press bed thus to minimize wear and the generation of heat during operation of the ejector. This is of considerable importance in connection with large presses requiring the application of considerable force to achieve the ejection function. Further in connection with the application of a large ejector force, the opposed cam and follower arrangement enables achieving an output force which is a multiple of the input force.

It is accordingly an outstanding object of the present invention to provide improved parts ejector mechanisms for presses.

Another object is the provision of ejector mechanisms which enable more accurate timing and coordination between slide movement and ejector operation than heretofore possible.

A further object is the provision of ejector mechanisms mountable on a press bed and actuated by cams directly attached to the press slide for displacement therewith.

Still a further object is the provision of an ejector mechanism of the foregoing character in which the cam contour is provided in accordance with known motion characteristics of the press slide, thus to achieve accuracy with regard to timing and coordination between slide movement and ejector operation.

Yet another object is the provision of an ejector mechanism of the foregoing character wherein an ejector member is hydraulically actuated by cam displacement of hydraulic pistons.

Still aother object is the provision of an ejector mechanism of the foregoing character in which an ejector member is mechanically actuated by cam displacement of linkage assemblies.

Yet a further object is the provision of ejector mechanisms of the foregoing character which provide a balanced imposition of forces on the ejector mechanism components and an ejecting force which is a multiple of forces applied by opposed actuating components.

Still another object is the provision of ejector mechanisms for presses which are structurally compact, thus enabling maximum structural integrity for the press bed, and which mechanisms are highly efficient in operation.

The foregoing objects, and others, will in part be obvious and in part pointed out more fully hereinafter in conjunction with the written description of preferred embodiments of the invention illustrated in the accompanying drawings in which.

Figure 1:
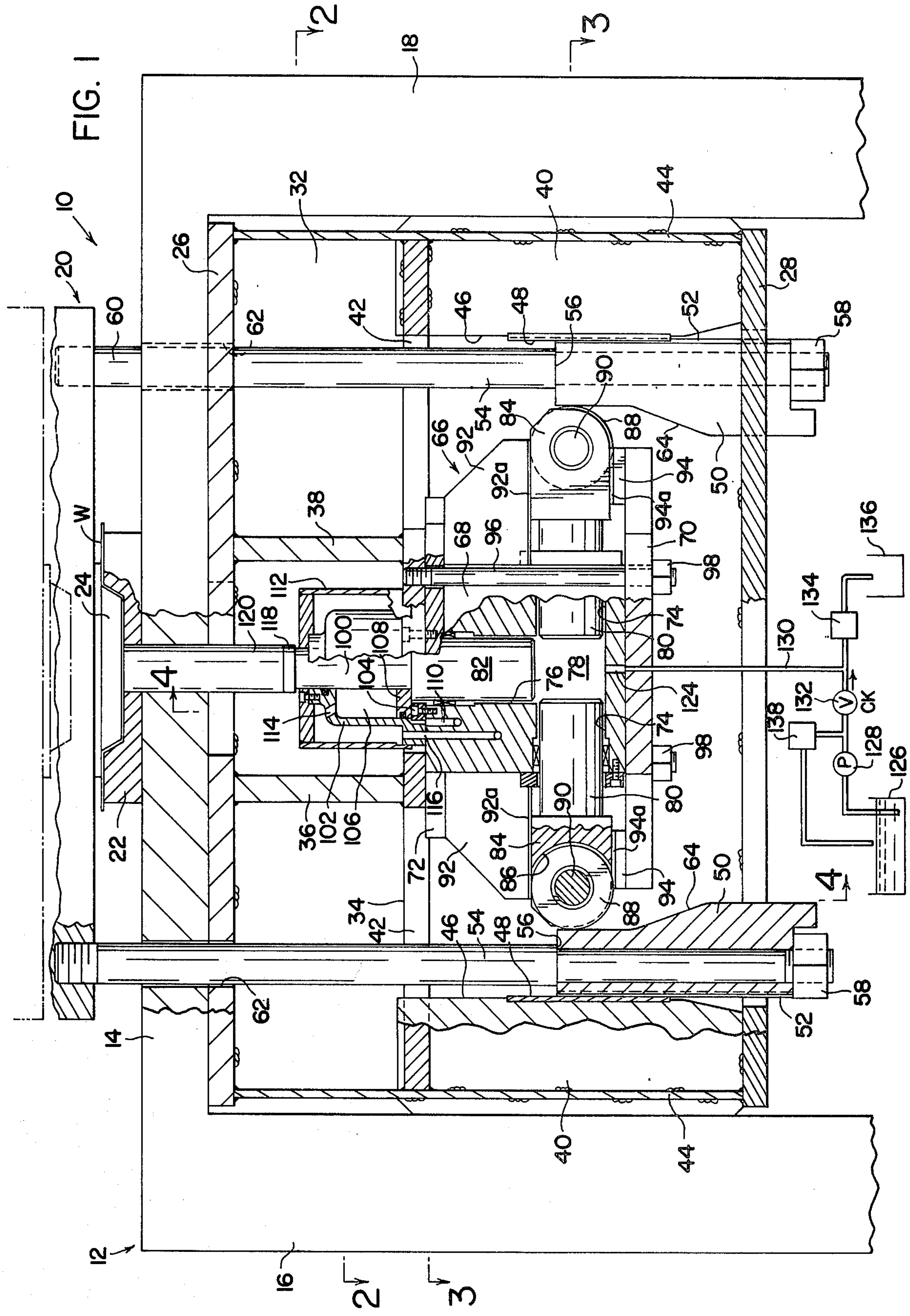
FIG. 1 is an elevation view, partially in section, of a hydraulically actuated ejector mechanism in accordance with the present invention.
Figure 2:
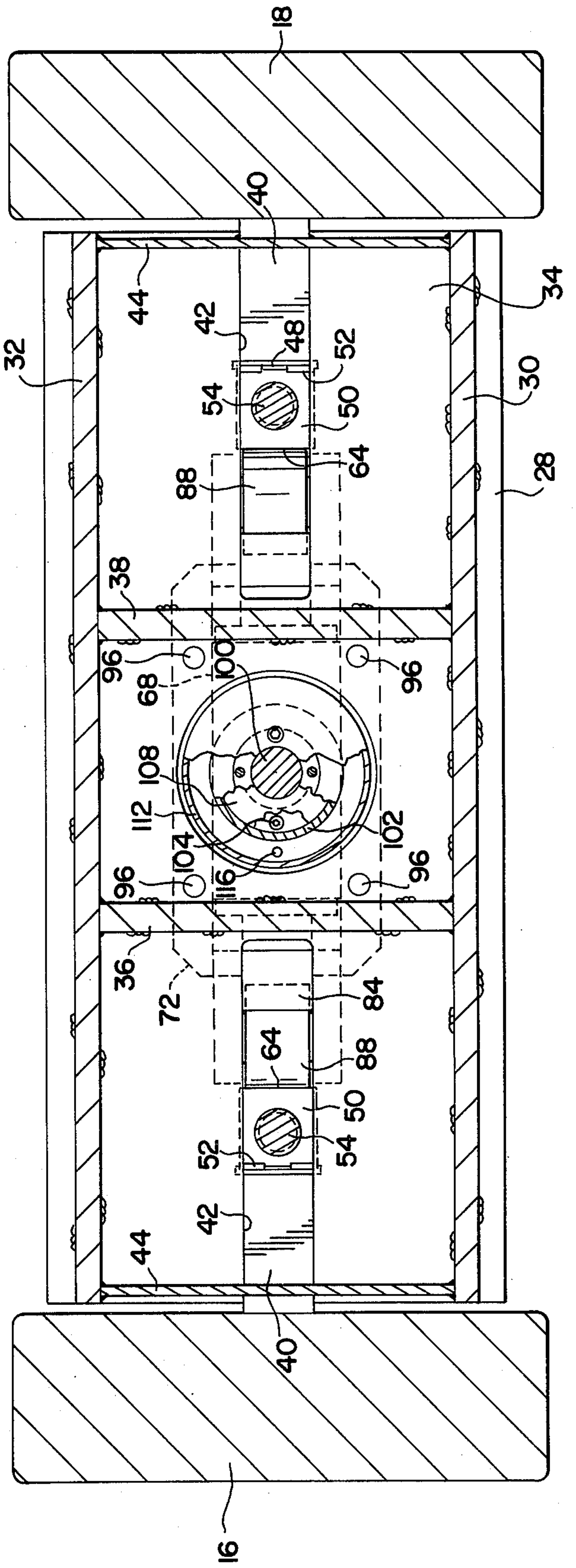
FIG. 2 is a plan view in section of the mechanism as seen along line 2—2 in FIG. 1.
Figure 3:
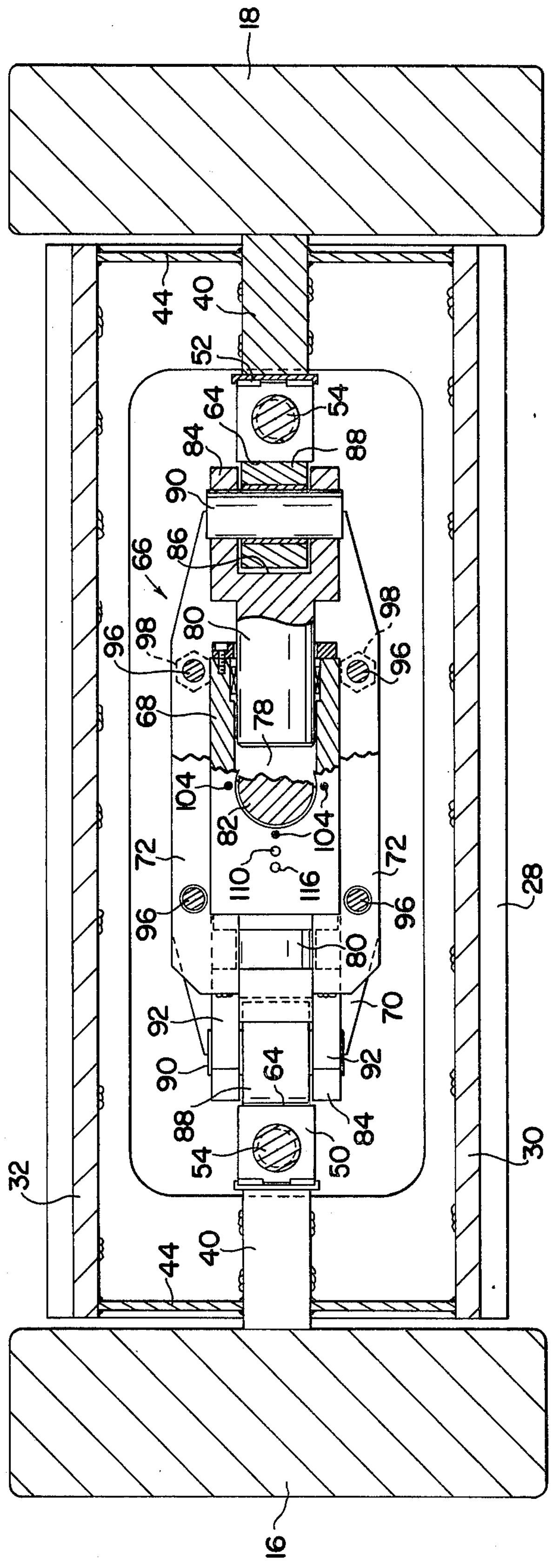
FIG. 3 is a plan view in section of the mechanism as seen along line 3—3 in FIG. 1; and, FIG. 4 is a sectional elevation view of the mechanism taken along line 4—4 in FIG. 1.
Figure 4:
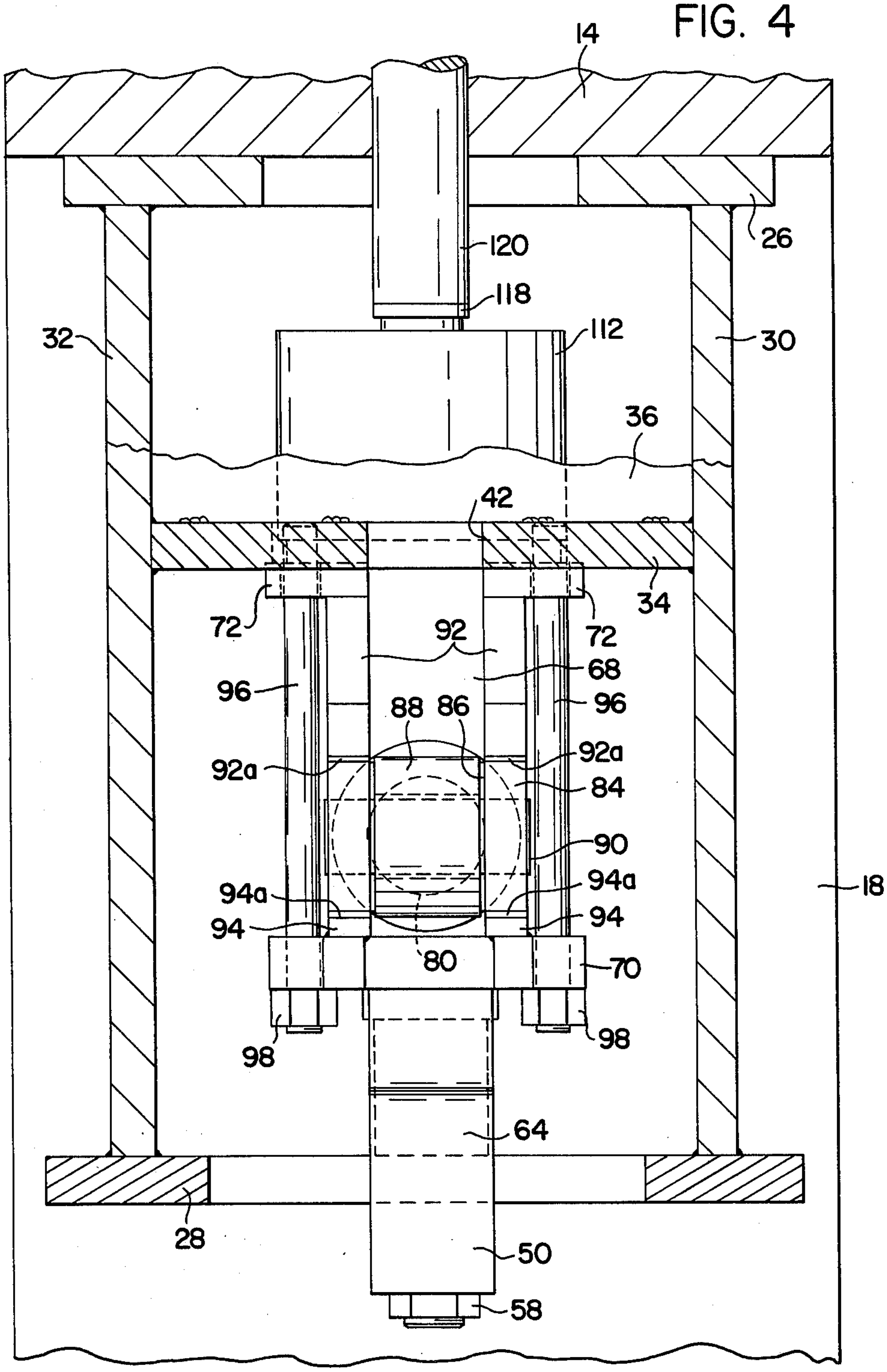

Referring now in greater detail to the drawings wherein the showings are for the purpose of illustrating preferred embodiments of the invention only and not for purposes of limiting the invention, FIGS. 1–4 illustrate an ejector mechanism 10 in accordance with the present invention mounted in a press bed indicated generally by the numeral 12 and which includes a horizontal bed plate 14 and opposite side portions 16 and 18. A press slide indicated generally by the numeral 20 is vertically reciprocable toward and away from bed 12. While the particular press structure and operation is not important to understanding the present invention, it will be appreciated that the press frame supports slide 20 for reciprocating movement and that the press includes an appropriate drive arrangement for imparting reciprocating movement to slide 20. As is well known in conjunction with metal forming presses, a die member 22 is mounted on bed plate 14 in alignment with a cooperably contoured die member 24 so that a sheet metal blank W positioned between the die members is shaped during movement of slide 20 through the work stroke portion of the total stroke of the slide. As will become apparent hereinafter, ejector mechanism 10 operates to eject the shaped article from die member 22 during upward movement of slide 20 relative to bed plate 14.

In the embodiment of the invention shown in FIGS. 1–4, ejector mechanism 10 includes a fabricated metal plate frame comprising a top plate 26, a bottom plate 28, side plates 30 and 32 extending between the top and bottom plates, an intermediate plate 34 extending between plates 30 and 32, and a pair of plates 36 and 38 extending vertically between top plate 26 and intermediate plate 34 and between side plates 30 and 32. The several plates defining the frame structure can be suitably interconnected such as by welding. A vertical cam guide block 40 is disposed at each of the opposite ends of bottom plate 28 and laterally centrally of side plates 30 and 32. The upper end of each guide block 40 is received in a corresponding opening 42 in intermediate plate 34. End plate components 44 close the opposite ends of the frame structure between plates 26, 28, 30 and 32 and are notched to receive the corresponding guide block. Each guide block is suitably interconnected with plates 28, 34, and 44, such as by welding.

The inner side 46 of each guide block 40 is provided with a vertical guideway 48 which receives and slidably supports a corresponding vertically reciprocable cam block 50. Each block 50 is provided with wear plates 52 slidably engaging the corresponding guideway 48. Each cam block 50 further includes a vertical bore therethrough receiving the lower end of a circular rod 54 on which the cam block is mounted against axial displacement by means of a shoulder 56 on rod 54 and a nut 58 threaded onto the lower end of the rod so as to capture the cam block against shoulder 56. The upper end 60 of each rod 54 extends through an opening 62 in top plate 26 and is suitably attached to press slide 20 such as by a threaded connection therebetween as shown in FIG. 1. Accordingly, it will be appreciated that vertical reciprocation of slide 20 imparts a corresponding vertical reciprocation of slide 20 imparts a corresponding vertical reciprocation to rods 54 and thus to cam blocks 50. Each cam block 50 is provided on its inner side with a cam track 64 which is contoured and operable as set forth hereinafter to actuate an ejector member of the mechanism in response to reciprocation of the slide.

The ejector mechanism further includes a hydraulic piston and cylinder assembly 66 including a body portion 68, a base plate 70 underlying body 68, and a pair of plate members 72 extending along opposite sides of body 68 at the upper end thereof. Body 68 is bored to provide an axially opposed pair of piston chambers 74 and a vertical piston chamber 76, all of which chambers open into a central chamber 78 in body 68. An axially opposed pair of pistons 80 are disposed in chambers 74 and are reciprocable relative to body 68 as set forth hereinafter, and a vertically displacable piston 82 is disposed in chamber 76. Each piston 80 has its outer end integral with or otherwise suitably attached to a corresponding follower block 84 having a recess 86 in the outer end thereof which receives a corresponding cam roller 88. Rollers 88 are supported for rotation relative to the cam blocks by corresponding pins 90.

Each cam roller 88 engages cam track 64 of the corresponding cam block 50, whereby displacement of cam blocks 50 upwardly from the position shown in FIG. 1 causes displacement of the corresponding piston 80 axially inwardly of body 68. Reciprocating movement of follower blocks 84 is guided relative to body 68 by means of corresponding upper guide plates 92 extending downwardly from plates 72, and a corresponding pair of guide shoes 94 mounted on top of base plate 70. Each guide plate 92 includes a wear strip **92*a* engaging the corresponding upper side portion of follower block 84, and each of the guide shoes 94 includes a wear strip 94*a* engaging the corresponding lower outer side portion of the follower block. The hydraulic piston and cylinder assembly is attached to intermediate plate 34 of the ejector assembly frame by means of a plurality of rods 96. Rods 96 have threaded upper ends extending through plates 72 and into threaded engagement with plate 34, and threaded lower ends extending through base plate 70 and receiving nuts 98**.

Vertically reciprocable piston 82 has an upper end 100 disposed within a housing 102 attached to body 68 by means of bolts 104 to provide an air chamber 106. A piston 108 is suitably attached to piston 82 for movement therewith within chamber 106, and the latter chamber is provided with a vent opening 110. Further, housing 102 is surrounded by an air tight casing 112 and is provided with an opening 114 at the end thereof opposite vent opening 110. The area between housing 102 and casing 112 is provided wth an air inlet opening 116 connected to a suitable source of air under pressure, not shown. It will be appreciated, therefore, that air under pressure entering inlet 116 passes through opening 114 into chamber 106 and operates to bias piston 82 downwardly toward the position shown in FIG. 1. End 100 of piston 82 is provided with an ejector pad 118 adapted to engage the lower end of an ejector pin member 120 which extends upwardly through the press bed and into die member 22.

Central chamber 78 of body 68 is provided with an inlet opening 124 adapted to receive hydraulic fluid delivered under pressure from a suitable source 126. Any suitable supply arrangement can be employed and, in the embodiment disclosed, a pump 128 is operable to deliver hydraulic fluid from source 126 to chamber 78 through a flow line 130 and a check valve 132 therein. A pressure responsive overload relief valve 134 is connected in line 130 and is operable as set forth hereinafter in response to an overload in the hydraulic fluid system to release fluid for flow to a sump or the like 136 which could, of course, be a part of or connected to source 126. In the event of such an overload, a relief valve 138 between pump 128 and check valve 132 is operable to recirculate fluid delivered by the pumpback to source 126.

In operation of the embodiment described hereinabove, presuming slide 20 to be in the lower position thereof relative to bed plate 14, as shown by solid lines in FIG. 1, air under pressure in chamber 106 biases piston 82 downwardly, whereby the fluid in chamber 78 is pressurized to bias pistons 80 laterally outwardly to maintain cam rollers 88 against cam tracks 64. During upward movement of slide 20 following the shaping of workpiece W, cam blocks 50 move upwardly with the slide, and cam tracks 64 cause pistons 80 to be simultaneously displaced axially inwardly of chamber 78. Such displacement pressurizes the fluid in chamber 78 and causes piston 82 to move upwardly relative to body member 68. Upward movement of piston 82 causes upward displacement of ejector pin member 120, thus to eject the formed workpiece from die member 22. During the ensuing movement of slide 20 toward bed plate 14, cam blocks 50 move downwardly, whereby cam tracks 64 allow pistons 80 to move axially outwardly with respect to chamber 78. Such outward movement is under the influence of air under pressure in chamber 106 biasing piston 82 to move downwardly relative to chamber 78. In the event of a pressure overload in the hydraulic system during actuation of the ejector mechanism, valve 134 responds to dump fluid in the system to sump 136.

As will be obvious from the foregoing description of the preferred embodiment of the present invention, the cam block 50 is directly connected to the press slide for displacement therewith relative to the press bed. It will be further appreciated that, for a given press, motion characteristics of the slide during the work stroke such as slide velocity are known. Therefore, it will be appreciated that the cam tracks on cam block 50 can be contoured in conjunction with the known motion characteristics of the slide so as to accurately time the movement of the ejector member with upward movement of the slide following the work forming operation and to provide desired acceleration and deceleration of the ejector member during the ejection movement thereof. It will be further appreciated that the ability to so time movement and control acceleration and deceleration of the ejector member enables increasing the speed of operation of the press thus to increase the production rate capability thereof. It will be appreciated too that the opposed cams and opposed ejector component actuation thereby further promotes a high output capability for the press. In this respect, the balanced distribution of forces imposed on the component parts of the ejector mechanism minimizes wear, vibration and excessive heating of component parts which can require considerable down time of the press for maintenance or replacement purposes. Additionally, the balanced structural arrangement achieved in accordance with the present invention enables minimizing the size of the ejector mechanism and thus maximizing the structural integrity with regard to a given press bed, whereby production of a given part is possible with a smaller press than would otherwise be required in order to avoid problems due to a lack of such structural integrity in the press bed.

Since many embodiments in the present invention can be made, and since many changes can be made in the embodiment herein illustrated and described, it is to be distinctly understood that the foregoing descriptive matter is to be interpreted merely as illustrative of the present invention and not as a limitation.

I claim:

1. An ejector mechanism for a press having a bed and a slide reciprocable relative thereto comprising, a frame mountable on said bed, a pair of opposed spaced apart parallel guide tracks on said frame, opposed cam members each slidably interengaged with one of said guide tracks, opposed cam follower means on said frame each actuatable by one of said cam members, means supporting said cam follower means for linear displacement by the corresponding cam member transverse to said guide tracks and toward and away from one another, ejector means between said opposed follower means and supported by said frame for reciprocating movement parallel to said guide tracks, means interengaging said opposed cam follower means and said ejector means to displace said ejector means in response to displacement of said follower means, and means interconnecting said cam members and said slide, whereby reciprocation of said slide displaces said cam members relative to said frame for said cam follower means to displace said ejector means relative to said frame.

2. The ejector mechanism according to claim 1, and means biasing said ejector means in one of the directions of reciprocation thereof.

3. The ejector mechanism according to claim 2, wherein said biasing means includes pneumatic piston and cylinder means.

4. An ejector mechanism for a press having a bed and a slide reciprocable relative thereto comprising, a frame mountable on one of said bed and slide, a pair of opposed spaced apart parallel guide tracks on said frame, opposed cam members each slidably interengaged with one of said guide tracks, opposed cam follower means on said frame each actuable by one of said cam members, means supporting said cam follower means for displacement by the corresponding cam member relative to said frame and toward one another, ejector means supported by said frame for reciprocating movement parallel to said guide tracks, means interengaging said opposed cam follower means and said ejector means to displace said ejector means in response to displacement of said follower means, and means interconnecting said cam members and the other of said bed and slide, whereby reciprocation of said slide imparts relative displacement between said cam members and frame for said cam follower means to displace said ejector means relative to said frame, said cam follower means each including a follower piston, said follower pistons having opposed ends, said ejector means including an ejector piston having an end, and said means interengaging said follower means and ejector means including corresponding cylinder means for said follower and ejector pistons and hydraulic fluid receiving chamber means in fluid communication with said ends of said follower and ejector pistons.

5. The ejector mechanism according to claim 4, and hydraulic fluid pressure responsive means operable to release fluid from said chamber means to release said ejector means for movement in one of the directions of reciprocation thereof in response to a predetermined force on said ejector means in said one direction.

6. The ejector mechanism according to claim 5, and means biasing said ejector piston in the direction toward said fluid receiving chamber means.

7. The ejector mechanism according to claim 6, wherein said biasing means is pneumatic and includes a second piston and air receiving cylinder means for said second piston.

8. An ejector mechanism for a press having a bed and a slide reciprocable relative thereto comprising, a frame mountable on said bed, pair of opposed spaced apart parallel cam guide tracks on said frame, opposed cam members each slidably interengaged with one of said guide tracks, hydraulic piston and cylinder means on said frame and including a housing having an axially opposed pair of piston chambers therein and a third piston chamber perpendicular to said pair, said pair and third chambers having inner ends opening into a common hydraulic fluid receiving chamber, a cam actuated piston in each of said pair of chambers, said cam actuated pistons being displacable toward one another by a corresponding one of said cam members, ejector means including ejector piston means in said third chamber and displacable axially of said third chamber in a direction of ejection in response to displacement of said cam actuated pistons toward one another, and means connecting said cam members with said slide for movement therewith, movement of said slide away from said bed displacing said cam members relative to said frame for said cam members to displace said cam actuated pistons toward one another.

9. The ejector mechanism according to claim 8, and means biasing said ejector piston means in the direction opposite said direction of ejection.

10. The ejector mechanism according to claim 9, wherein said biasing means includes pneumatic piston and cylinder means including a cylinder and piston reciprocable therein and connected to said ejector piston means.

11. The ejector mechanism according to claim 10, and hydraulic fluid pressure responsive means operable to release fluid from said common chamber in response to an overload force on said ejector piston means during movement thereof in said direction of ejection.

* * * * *